Feb. 13, 1951 K. W. GRAYBILL 2,541,354

SWITCHING APPARATUS

Filed Dec. 12, 1946 4 Sheets-Sheet 1

INVENTOR.
KENNETH W. GRAYBILL

BY

ATTORNEY

Feb. 13, 1951 K. W. GRAYBILL 2,541,354

SWITCHING APPARATUS

Filed Dec. 12, 1946 4 Sheets-Sheet 2

INVENTOR.
KENNETH W. GRAYBILL

BY Chas. W. Candy

ATTORNEY

Feb. 13, 1951 K. W. GRAYBILL 2,541,354

SWITCHING APPARATUS

Filed Dec. 12, 1946 4 Sheets-Sheet 3

INVENTOR.
KENNETH W. GRAYBILL

BY Chas. W. Candy

ATTORNEY

INVENTOR.
KENNETH W. GRAYBILL

BY

Chas. W. Candy

ATTORNEY

Patented Feb. 13, 1951

2,541,354

UNITED STATES PATENT OFFICE 2,541,354

SWITCHING APPARATUS

Kenneth W. Graybill, Elmhurst, Ill., assignor to Automatic Electric Laboratories, Inc., Chicago, Ill., a corporation of Delaware Application December 12, 1946, Serial No. 715,733

15 Claims. (Cl. 179—27.54)

The present invention relates to switching apparatus and more particularly to improvements in switching apparatus of the form suitable for use in automatic or semi-automatic telephone systems.

An object of the invention is to provide a new and improved switching apparatus for use in association with a multiple field comprised of bare conductors so that connections of one set of circuit conductors can be established to another set of circuit conductors in a simple and efficient manner.

Another object of the invention is to provide an improved non-numerical lineswitch of simple and economical construction by means of which a plurality of trunk circuits and a plurality of subscribers' line circuits are so associated that any subscriber's line circuit can be automatically connected to any trunk circuit, means being included whereby free trunk circuits are individually pre-assigned for the extension of calls from the subscribers' line circuits.

A further object of the invention is to provide a non-numerical lineswitch in which new and novel means are employed for preventing a subscriber's line circuit from connecting with more than one trunk circuit at one time.

A still further object of the invention is to provide an improved switching apparatus which can be controlled either as a lineswitch for outgoing trunk calls from subscribers' line circuits or as a connector for incoming trunk calls to subscribers' line circuits.

Another object of the invention is to provide new and novel means in the switching apparatus whereby line and cut-off relays associated with the subscribers' line circuits also control mechanical functions related to the extension of calls from subscribers' line circuits to pre-assigned trunks in addition to performing their usual well-known circuit functions.

Another object of the invention is to provide new and novel means in the switching apparatus whereby the cut-off relays associated with the subscribers' line circuits perform, in addition to their usual well-known circuit functions, mechanical functions related to the completion of incoming trunk calls to the subscribers' line circuits.

A feature of the invention, in addition to the inclusion of a simple and inexpensive trunk multiple field consisting of bare conductors, resides in the also relatively inexpensive arrangement of the subscribers' line equipment conductors. Each such line equipment conductor comprises a metallic strip spanning the multiple field conductors, but having no normal electrical connections therewith, and a conductor member depending therefrom for a corresponding bare conductor of each trunk in the multiple field, these depending conductor members being adapted to be urged into electrical contact with their respective trunk conductors in the multiple field. Each such conductor strip and its depending conductor members are stamped from a single piece of metallic material, preferably spring stock, and, therefore, the strip serves to multiple the depending conductor members together so that no multiple wiring is required therefor.

Another feature of the invention relates to the provision of a switching mechanism in which a plurality of sets of movable conducting elements representing a subscriber's line circuit are arranged in co-operative relationship with a plurality of sets of stationary conducting elements representing respective trunk circuits, mechanical means controlled by the functioning of the cut-off relay of the subscriber's line circuit being provided for urging a particular one of the sets of movable conducting elements into electrical contact with the corresponding stationary element.

A further feature of the invention is the provision of a novel mechanical "trigger" device which is controlled by the armatures of the line and cut-off relays of a subscriber's line circuit to form a selective medium for determining whether the trunk connecting apparatus associated with the subscriber's line circuit shall or shall not seize a pre-assigned trunk circuit.

A still further feature of the invention relates to the method of mounting a plurality of the switching apparatus units on each of two frames in such a manner that certain control equipments are made common to the switching apparatus units on both frames, thereby effecting a substantial reduction in the required number of such control equipments.

Another feature of the invention is the inclusion of novel means for resetting the trunk connecting apparatus units associated with the subscribers' line circuits to their normal non-operated positions upon the release of previously established connections, thereby permitting the "grading" of the trunk circuits to obtain a greater percentage of trunking than that permitted by the regular number of trunk circuits.

There are other objects and features of the invention having to do for the most part with the details in carrying out the foregoing. The various objects and features of the invention will be understood best upon a further perusal of the description in connection with the accompanying drawings which show a preferred embodiment of the invention.

Referring now to the drawings,

In Fig. 2, the vertically disposed bar is shown in the operated, or pre-assigned, position.

Fig. 7 is similar to Fig. 6, plus the addition of a hinged insulated plate which presses the trunk contacting ends of all four line equipment conductors into sliding contact with the related conductors of the pre-assigned trunk when an outgoing trunk call is initiated on the line circuit.

Figures 5, 6, 7, 8:
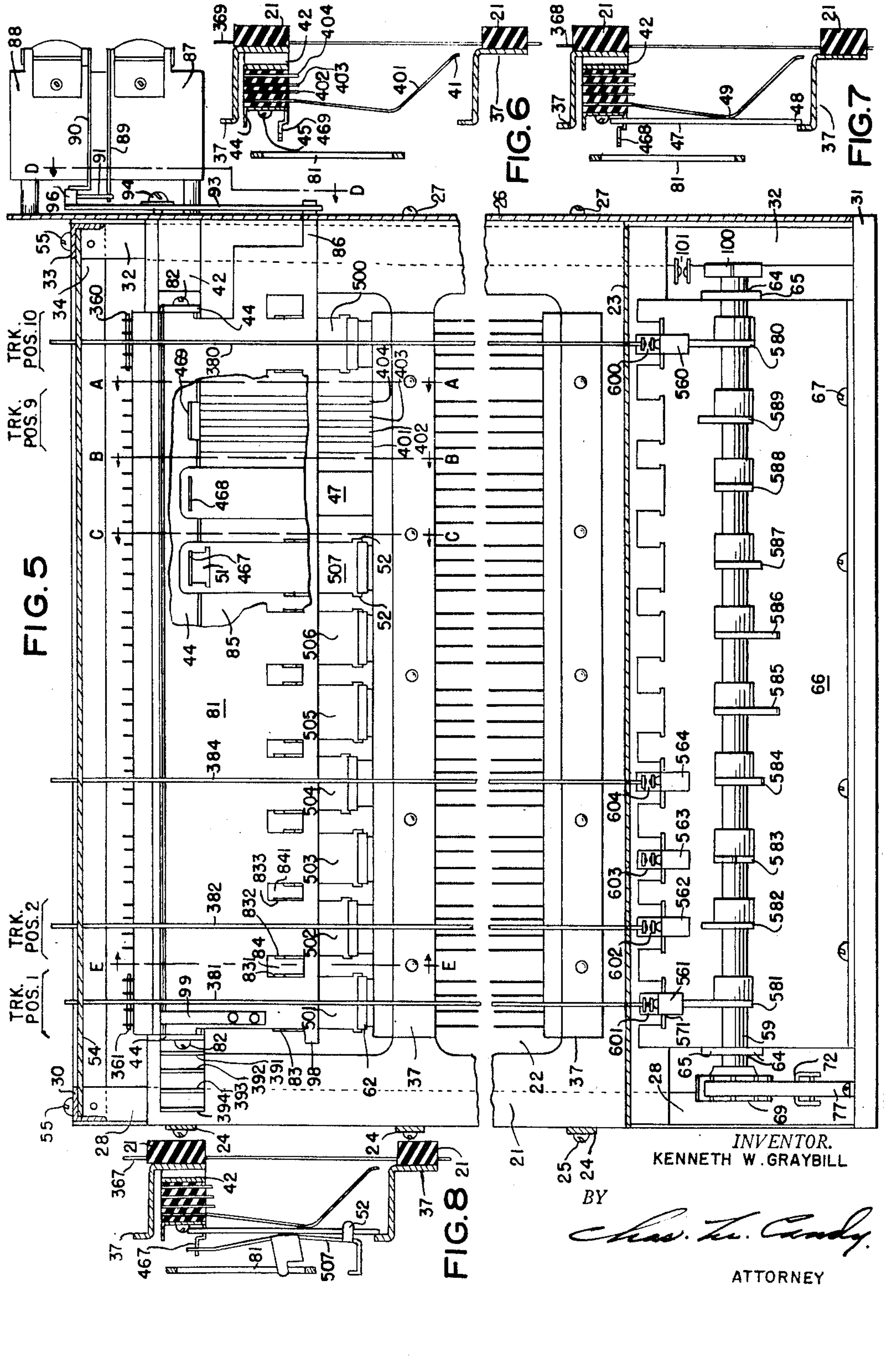
Fig. 5 is a front view, in elevation, of one frame of trunk selecting apparatus taken along the line X—X in Fig. 1. This view shows ten trunks of four bare (uninsulated) conductors each and the trunk selecting apparatus for one line circuit.
Fig. 6 is a sectional view taken along the line A—A in Fig. 5, showing the construction of the trunk contacting ends of the line equipment conductors. Only one line equipment conductor is shown in complete detail, the remaining three conductors being cut off near the upper ends to simplify the figure.
Fig. 7 is a sectional view taken along the line B—B in Fig. 5.

Fig. 8 is a sectional view taken along the line C—C in Fig. 5, showing a second hinged piece, or actuator, which transmits mechanical power, responsive to an outgoing trunk call being initiated on the line circuit, to the hinged insulated plate mentioned in the preceding paragraph for causing the hinged insulated plate to press the four line equipment conductors into contact with the related conductors of the pre-assigned trunk.

Figures 9, 10A, 10B, 10C, 11, 12, 13:
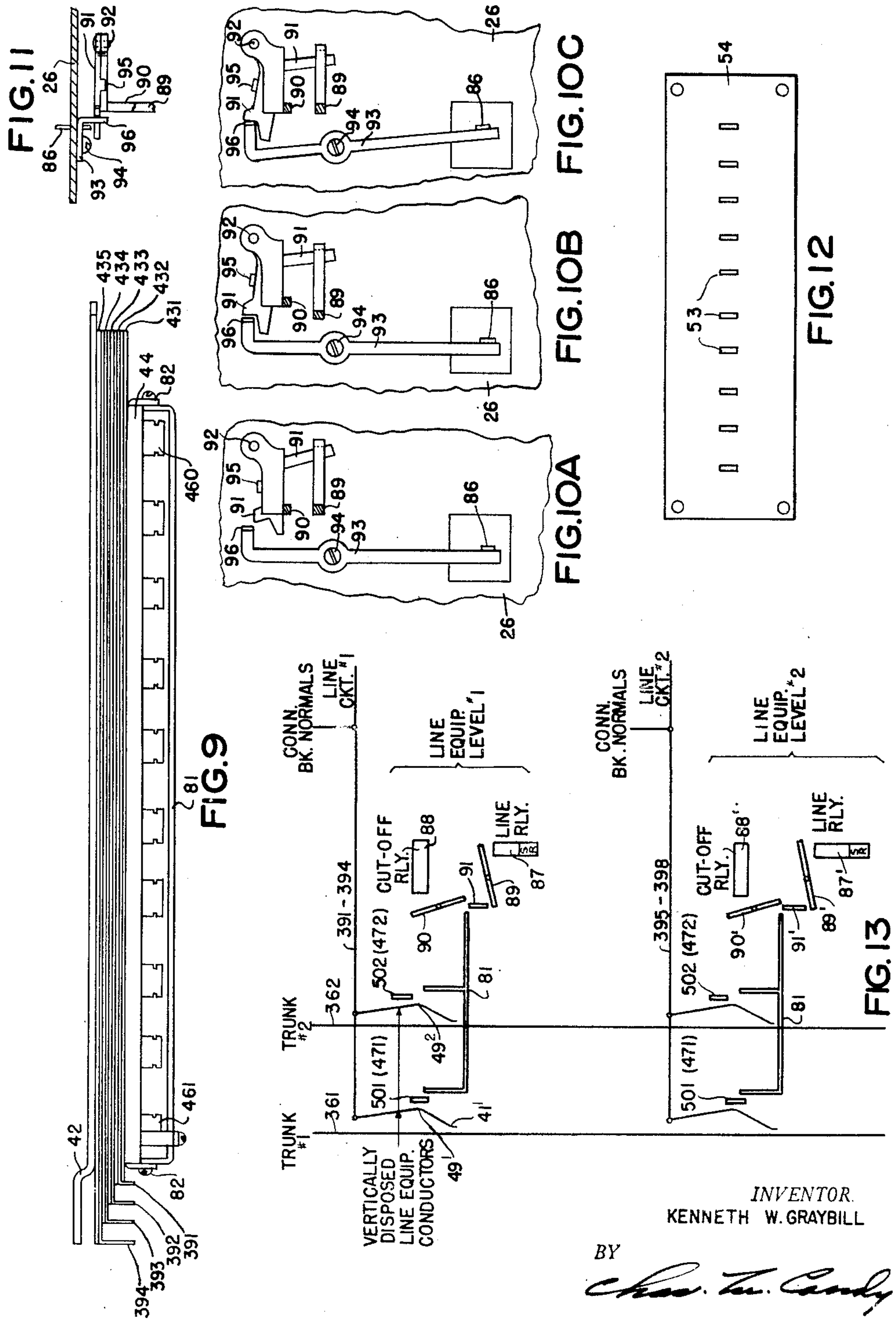

Fig. 9 is a partial top view of Fig. 5, in elevation, and shows the four continuous horizontal conductors of a line equipment which span the bank of conductors of the ten trunks.

Fig. 10—A is a fragmentary end view, in elevation, taken along the line D—D in Fig. 5 of the line relay and cut-off relay mechanical linkage with the trunk selecting apparatus of the line equipment. In this view, the armatures of both relays are shown in the normal, or non-operated, position.

Fig. 10—B is a view similar to Fig. 10—A with the exception that the armature of the line relay is shown in the operated position.

Fig. 10—C is a view similar to Fig. 10—A with the exception that the armatures of both the line and cut-off relays are shown in the operated positions.

Fig. 11 is a top view, in elevation, of Fig. 10—C, showing the pivoted arrangement of the trigger device on the armature of the cut-off relay.

Fig. 12 is a plan view of the upper bearing plate for the ten vertically disposed bars associated with the ten trunks. The bearing in this plate for each bar consists of an elongated slot, as the bars are fabricated from flat metal stock.

Fig. 13 is a single-line schematic diagram of the general trunking arrangement of the line equipment trunk selecting apparatus.

Figure 14:
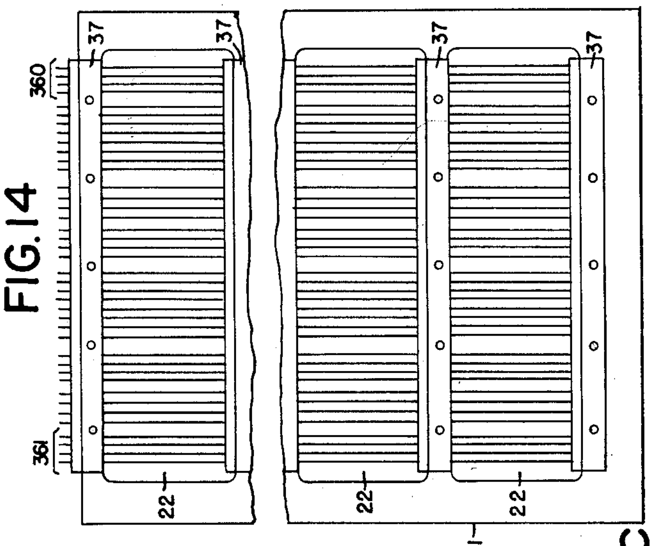

Fig. 14 is a front view, in elevation, of one frame showing the structural arrangement of the frame proper and the manner in which the vertical bare trunk conductors are threaded through the horizontal members of the frame.

Figure 15:
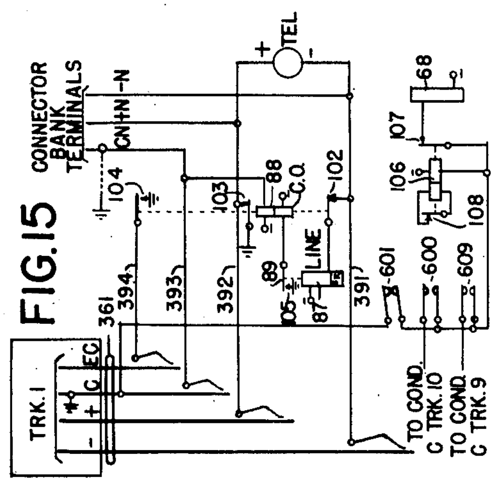

Fig. 15 is a simplified circuit plan showing in particular the means employed for controlling the pre-assignment of a free trunk.

Fig. 16—A is a fragmentary end view similar to the end view shown in Fig. 10—A with the general exception that in this instance the line relay and cut-off relay mechanical linkage controls the trunk selecting apparatus of one line equipment mounted on one outgoing trunk frame and one incoming trunk frame. In this view, the armatures of both relays are shown in the normal, or non-operated position.

Fig. 16—B is a view similar to Fig. 16—A with the exception that the armature of the cut-off relay is shown in the operated position.

Fig. 16—C is a view similar to Fig. 16—A with the exception that the armature of the line relay is shown in the operated position.

Fig. 16—D is a view similar to Fig. 16—A with the exception that the armature of the cut-off relay is shown in the operated position and the armature of the line relay is shown in the normal position after having been in the operated position as shown in Fig. 16—C and then subsequently released by the operation of the armature of the cut-off relay.

Figures 16A, 16B, 16C, 16D, 17:
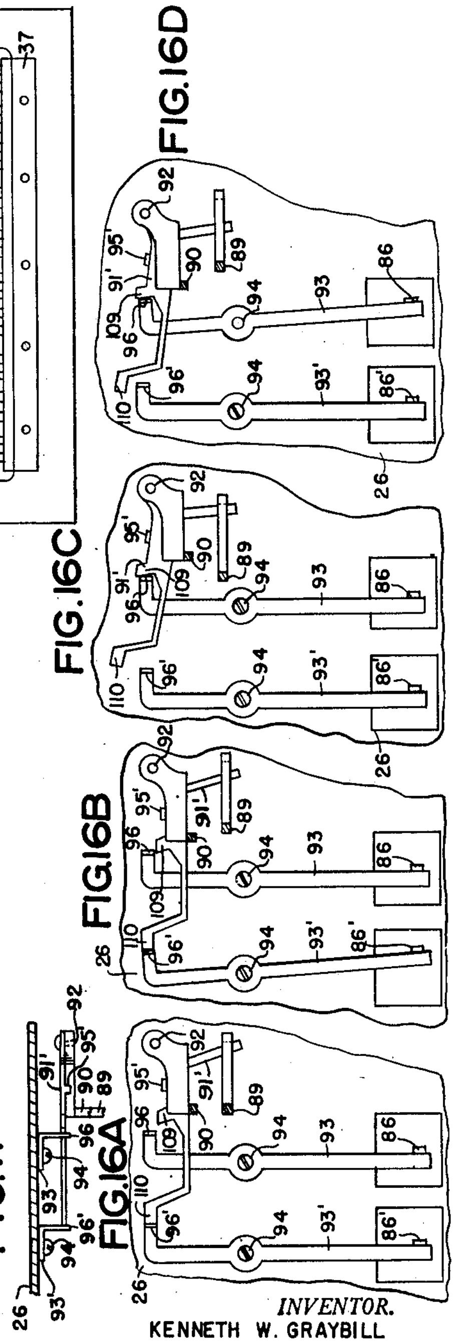

Fig. 17 is a top view, in elevation, of Fig. 16—A, showing the pivoted arrangement of the trigger device on the armature of the cut-off relay.

Figures 1, 2, 3, 4:
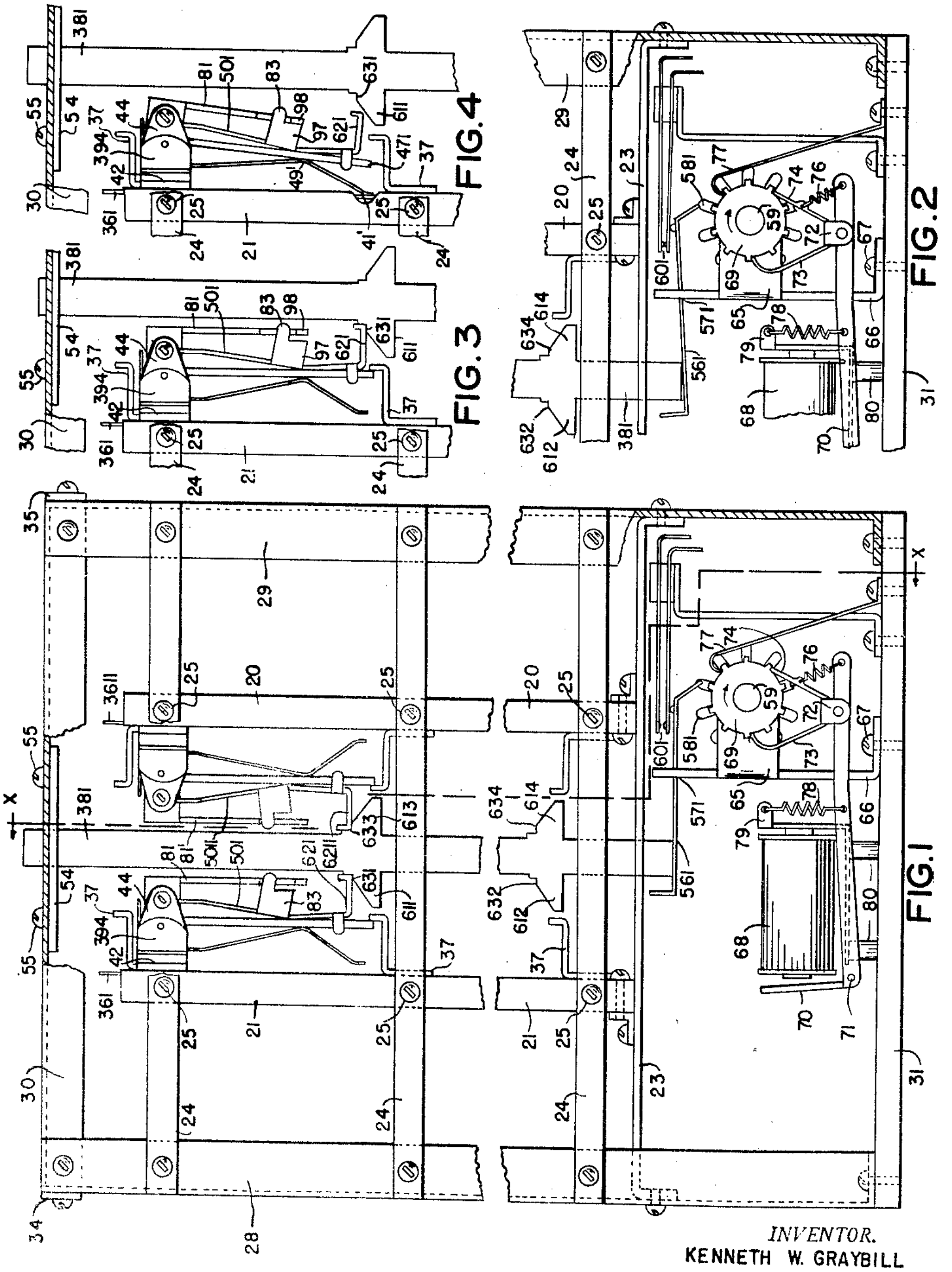
Fig. 1 is an end view, in elevation, showing a method of mounting two frames of trunk selecting apparatus face to face in parallel rows. In this view, the vertically disposed bar and the related trunk selecting apparatus for two line circuits (one line circuit on each rack) are shown in the normal, or non-operated position.
Fig. 2 is a fragmentary end view, in elevation, similar to the lower part of Fig. 1.
Fig. 3 is a fragmentary end view, in elevation, similar to the upper part of Fig. 1, showing the vertically disposed bar in the pre-assigned position and the consequent pre-assigned position of the related trunk selecting apparatus of a line circuit preparatory to seizing the pre-assigned trunk.
Fig. 4 is a fragmentary end view, in elevation, and similar to the view shown in Fig. 3. In this view the trunk selecting apparatus of the line circuit has seized the pre-assigned trunk, and the vertically disposed bar has been returned to the normal position.
Figure 18:
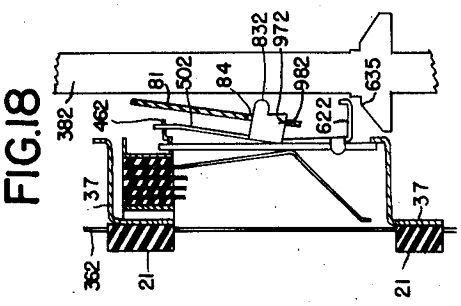

Fig. 18 is a sectional view taken along the line E—E in Fig. 5, similar to the view shown in Fig. 4 with the exception that Fig. 18 shows trunk position #2 instead of trunk position #1, and illustrates how the line equipment actuator at trunk position #2 is prevented from operating when the related vertically disposed bar is in the operated, or pre-assigned position.

Referring more particularly to Figs. 1 and 5, there is illustrated trunk selecting apparatus mounted on two frames 20 and 21. The frames 20 and 21 are fastened to a horizontal base plate 23 in any suitable manner and are held in a vertical position, face to face and parallel to each other, by a plurality of horizontal cross braces 24 attached to one end of the frames by means of screws 25 and by a vertical plate 26 attached to the other end of the frames by means of screws 27. The cross braces 24 extend to the right and left of the frames 20 and 21 and are fastened to angle uprights 28 and 29 in any suitable manner. Uprights 28 and 29 are joined together at their upper ends by cross angle 30 and at their lower ends by a base plate 31. Two additional uprights similar to uprights 28 and 29 are attached to vertical plate 26 in the respective vertical planes of uprights 28 and 29, are joined together at their upper ends by cross angle 33 and at their lower ends by base plate 31. One of these additional uprights is identified by the reference number 32 in Fig. 5, the other additional upright not being shown in any view. Horizontal bar 34 joins uprights 28 and 32 together at their upper ends, and horizontal bar 35 joins upright 29 in a similar manner to the additional upright which is not shown. Frames 20 and 21, vertical plate 26, bases 23 and 31, uprights 28, 29, 32 and the additional upright not shown are thus rigidly joined together to form a substantial structural assembly.

It should be understood at this time that it is not essentially necessary nor always desirable to mount frames face to face in parallel rows—the frames may be mounted in rows without being face to face. Alternatively, only one row of frames may be used under certain circumstances, said row containing only one frame, or two or more frames adjacent to each other, as required.

Referring now to the front view (Fig. 14) of frame 21, the frame is preferably fabricated of insulating material and is provided with a number of generally rectangular openings 22 arranged one above the other so that the frame has an appearance somewhat ladder-like. The number of openings 22 is dependent upon the number of horizontal rows of line equipments to be mounted on the frame, one opening being required for each row of line equipment. The frame may be provided with any number of openings 22 and associated rows of line equipments, limited only to the desired maximum height of the frame, the vertical members of frame 21 in Figs. 5 and 14, being shown broken to indicate this flexibility. For the purposes of identification, each horizontal row of line equipments will now be referred to as a line equipment level.

Frame 21 is equipped with forty vertically disposed bare conductors mounted in four conductor groups comprising, for example, ten trunks. Each trunk includes four conductors, the four conductors of trunk #1 being shown at the left-hand end of frame 21 and identified by the group number 361, and the four conductors of trunk #10 at the right-hand end and identified by the group number 360. It is obvious that each trunk may include more than four conductors or less than four conductors, and also that the number of trunks may be less or more than ten. The vertically disposed trunk conductors 361—360 are secured to the bottom horizontal member of frame 21 and then successively pass through the bottom rectangular opening 22, slots in the next above horizontal member of frame 21, the second rectangular opening 22 from the bottom of the frame, slots in the next above horizontal member of frame 21, and so on through other rectangular openings 22 and slots in other horizontal members of frame 21 until the conductors pass through slots in the top horizontal member of frame 21. At this point the conductors rise a suitable distance above the top horizontal member of frame 21 where they are connected to terminals or wiring according to circumstance. The conductors are held rigidly in the slots of the horizontal members of frame 21 by means of cross plates 37 fastened to the horizontal members of frame 21 as shown in Fig. 14, and in the rectangular openings 22 the conductors serve as wiper contacts for the conductors of the line equipments mounted horizontally across each rectangular opening 22. The vertically disposed trunk conductors 361—360 consist of stiff bare wires or other suitable material preferably circular in cross section but may be of square, rectangular or other cross section.

As previously mentioned, each rectangular opening 22 of frame 21 provides facilities for mounting one level of line equipment across the bank of vertically disposed trunk conductors 361—360 for the purpose of enabling the line circuit associated with said level of line equipment to connect with any trunk of trunks #1 to #10 inclusive. Accordingly, each level of line equipment includes four horizontally disposed conductors 391—394 insulated from each other and from mounting bracket 42 by means of strip insulators 431—435 (best seen in Fig. 9) and spanning the bank of vertically disposed trunk conductors 361—360. Each horizontally disposed line equipment conductor such as 391 has ten vertically disposed and spaced conductor members depending therefrom, each depending member hanging down in front of one vertically disposed conductor of each of the ten trunks #1 to #10, said vertically disposed conductor of each trunk being the same relative conductor of all ten trunks. Each horizontally disposed conductor such as 391 and its ten depending members are stamped from a single piece of spring material and, therefore, the horizontal conductor 391 serves to multiple the ten depending members together. In Fig. 5 on trunk position #9, can be seen the four vertically disposed conductors 401, 402, 403, and 404 of the respective horizontally disposed line equipment conductors 391, 392, 393, and 394, and Fig. 6, which is a sectional view taken along the line A—A in Fig. 5, discloses vertical conductor 401 in full, the equivalent conductors 402, 403 and 404 being cut off near their top ends in order to simplify the figure.

The vertically disposed line equipment conductors such as 401—404 are so tensioned that in the normal, or non-operated, position the free ends 41 are close to but clear of the related vertically disposed trunk conductors 369 as shown in Fig. 6. When the four vertically disposed line equipment conductors associated with one of the ten trunks are flexed in the manner to be described presently, the free ends such as 41' in Fig. 4 of said line equipment conductors are pressed into sliding contacts with the four bare vertically disposed conductors of the particular trunk. The left-hand ends of horizontally disposed line equipment conductors 391—394 are formed at a substantially right angle to the main body of the conductors, as shown in Fig. 9, and are pierced or otherwise arranged to form terminals to which suitable line equipment wiring may be attached.

Referring now to Figs. 5, 6 and 9, there is a metal channel strip 44 suitably attached to bracket 42 by means of screws 45 (Fig. 6) passing through conductors 391—394 and strip insulators 431—435. The bottom flange of channel 44 is shaped (Fig. 6) to form ten hooks 461—460 so spaced as shown in Figs. 5 and 9 as to locate one hook near the top and to the front of the four vertically disposed line equipment conductors associated with each of the ten trunks.

Suspended from each hook 461—460 in a hinged manner and in front of the four related vertically disposed line equipment conductors is a rectangular shaped plate such as plate 47 shown on the eighth trunk position in Fig. 5 and in Fig. 7. Each of these plates is fabricated from suitable insulating material and is of sufficient width to span the four related vertically disposed line equipment conductors such as 401—404. The lower end 48 of plate 47 extends somewhat below the left vertical member of the lower Z-shaped angle 37 in Fig. 7, and the normal tensions of the four vertically disposed line equipment conductors cause said conductors to press against plate 47 at point 49 to maintain plate 47 in the normal position.

Also suspended from each hook 461—460 and in front of the insulated plates (similar to plate 47) is a stirrup-shaped piece, or actuator, 501—500, as shown in Figs. 5 and 8. A complete front view appearance of actuator 507 is disclosed in Fig. 5, and a right-hand side view in Fig. 8. An inverted T-shaped aperture 51 near the upper end of actuator 507 provides facilities for suspending actuator 507 on hook 467 and, in addition, provides for a limited up and down movement of actuator 507 with respect to hook 467. Figs. 5 and 8 show actuator 507 in its lowest possible position with respect to hook 467. The extreme upper position of actuator 507 is accomplished when actuator 507 is urged upwardly in the manner to be explained later, until the lower edge of aperture 51 is stopped just short of making contact with the lower edge of hook 467. The slots in aperture 51 provide means for placing actuator 507 on hook 467. The width of actuator 507 approximates the width of the related insulated plate (such as plate 47), and flanges 52 near the lower end of actuator 507 serve to keep actuator 507 and the related insulated plate in vertical alignment with each other. It should be understood that all of the actuators 501—500 are alike in construction and operation to that just described for actuator 507.

As mentioned in the preceding paragraph, the actuators 501—500 in a horizontal level of line equipment may be moved upward or downward within prescribed limits on the related hooks 461—460. The up and down movements of the actuators 501—500 are controlled by bars 381—380 which also have controlled upward and downward movements. One bar is associated with each vertical row of actuators and, therefore, each bar controls the up and down movements of the same positioned actuator of each level of line equipments mounted on the frame—for example, bar 381 at the left in Fig. 5 controls the up and down movements of actuator 501 on each level of line equipments, and bar 380 to the right controls the up and down movements of actuator 500 on each level of line equipments. For the sake of clarity and to simplify the figure, only four bars (381, 382, 384, 380) and one level of line equipment are shown in Fig. 5, it being understood that there is one bar for each vertical row of actuators, or a total of ten bars (381—380), and that there may be as many levels of line equipments as required.

The bars 381—380 are fabricated from flat metal stock but may, of course, be of other cross section. The upper bearings for the bars consist of slots 53 in a plate 54 (Fig. 12) which is attached to upper cross angles 30 and 33 of the frame-work structural assembly by screws 55 or other suitable means (Figs. 1 and 5). The slots 53 are spaced on the same mounting centers as the hooks 461—460 shown in Fig. 9. The lower bearings for the bars consist of slots (not shown) in base plate 23 corresponding to and in vertical alignment with the slots 53 in upper bearing plate 54. The bars 381—380 are thus located in proper vertical alignment in front of the actuators 501—500 on trunk positions #1 to #10 inclusive. It should be understood that if the overall height of frame 21, due to the number of horizontal levels of line equipments mounted thereon, is sufficient to require intermediate bearings for bars 381—380, such intermediate bearings can be readily provided in a manner similar to upper bearing plate 54. Simple slot bearings are disclosed for the bars but it should be understood at this time that any suitable type of bearing may be employed, according to circumstance or preference.

As previously stated and as shown in Fig. 1, the two frames 20 and 21 are mounted face to face and parallel to each other with the associated vertically disposed bars such as 381 located between frames 20 and 21, each such bar being associated with the same relative trunks of the two frames. Since such bars serve both frames, it follows that the two trunks directly opposite each other in both frames are in reality one and the same trunk and, therefore, have their vertically disposed bare wire conductors multipled together by suitable wiring (not shown) at the tops of the two frames. For example, trunk #1 at the extreme left of frame 21 (Fig. 5) is related to double bar 381 and since the trunk at the extreme right of frame 20 (a front view of frame 20 is not shown but such a front view would be the same as Fig. 14, with the exceptions that trunk conductors 361 in Fig. 14 would be labeled 360 and trunk conductors 360 in Fig. 14 would be labeled 361) is also related to double bar 381, the vertically disposed conductors of these two trunks are multipled together.

The up and down movements of bars 381—380 in their bearings are controlled by respective cam-operated levers 561—560 upon which the lower ends of the bars rest (Fig. 1). The ten cams 581—580 which actuate the ten levers 561—560 are mounted in any suitable manner on a motor-driven shaft 59 which extends horizontally across the length of frame 21 as shown in Fig. 5. The cams 581—580 are spaced horizontally on the same vertical mounting centers as bars 381—380 and are spaced one-tenth of a revolution apart with respect to the circumference of shaft 59, thereby producing ten cam positions along the length of shaft 59 spaced successively one-tenth of a revolution apart. In any given position of motor-driven shaft 59 one of the ten levers 561—560 will be in the position shown in Fig. 2, and the remaining nine levers will be in positions equivalent to that shown in Fig. 1. In Fig. 2, the cam indicated by the reference number 581 has raised the right-hand end of lever 561 against the spring pressure of contact 601, thus causing the left-hand end of lever 561 to be correspondingly lowered and thereby permit the associated vertically disposed bar 381 to drop by gravity to the position indicated in Fig. 2. Lever 561 is pivoted at point 571 in any suitable manner. The normal tensions of contact springs 602—600 associated with levers 562—560 hold the nine levers in the approximately horizontal position indicated in Fig. 1 and, consequently, the associated nine bars 382—380 are kept in the raised, or normal, position similar to that shown in Fig. 1. Referring particularly to Fig. 5, bar 381 on trunk position #1 is in the lower, or dropped, position and bars 382, 384 and 380 respectively on trunk positions #2, #4, and #10 are in the raised, or normal, position. The vertical height difference between the bars can best be observed by comparing the top ends of bars 381 and 382 on trunk positions #1 and #2.

Motor-driven shaft 59 rotates in bearings 64 mounted on horizontal flanges 65 of a bracket 66 which extends horizontally across frame 21 and is fastened to base plate 31 by means of screws 67. The motor drive may include any suitable type of electric motor, or it may be of the ratchet type powered by an electromagnet 68 as shown in Fig. 1. The ratchet mechanism comprises a ten-toothed wheel 69 attached to the left-hand end of shaft 59 and an L-shaped armature 70 pivoted at 71 in front of one pole of electromagnet 68 and fitted with a pivoted pawl and stop bracket assembly 72, comprising pawl 73 and stop 74, located near the outer end of the long arm of armature 70. Electromagnet 68 is attached to the vertical member of an L-shaped bracket 79, the horizontal member being fastened to base 31 by means of screws (not shown) passing through bushings 80. A spring 78 attached to bracket 79 and the long arm of armature 70 provides power for returning armature 70 to normal position after each operation. A tensioned detent 77 is suitably mounted on base 31, the free end of detent 77 engaging a tooth of wheel 69 in the manner and for the purpose to be described later in connection with the operating explanation of the ratchet drive.

Each vertically disposed bar 381—380 has a sloping member, or shoulder, projecting from the bar at each level of line equipment and extending towards the associated line equipment, as shown in Fig. 1. This shoulder arrangement can best be understood by considering the particular case of bar 381. Referring now to Fig. 1, bar 381 has two shoulders 611 and 612 projecting from its left-hand edge towards frame 21 at different line equipment levels and two shoulders 613 and 614 similarly projecting from its right-hand edge towards frame 20. Line equipment actuator 501 has a flange, or stirrup, 621 at its lower end which co-operates with shoulder 611 of bar 381 to accomplish the up and down movements of actuator 501. Similarly actuator 5011 has a flange, or stirrup, 6211 which co-operates with shoulder 613 of bar 381 to accomplish the up and down movements of actuator 5011. Now as bar 381 is dropped to the lower position in the manner previously described, shoulders 611, 612, 613 and 614 of bar 381 correspondingly reach a lower position. Stirrup 621 of actuator 501 normally rests on ledge 631 of shoulder 611, and stirrup 6211 of actuator 5011 similarly rests on ledge 633 of shoulder 613, and hence, when bar 381 drops to the lower position, line equipment actuators 501 and 5011 also drop by gravity a corresponding distance. The dropping of line equipment actuators 501 and 5011 in the manner just described constitutes a pre-assignment of trunk #1 related to dropped bar 381. The purpose of such trunk pre-assignment and the subsequent selection of the pre-assigned trunk by one of the levels of line equipments will be explained later in this specification. In the arrangement shown in Fig. 1, the vertically disposed bars intermediate the two frames 20 and 21 are common to both frames and, consequently, have shoulders projecting from both edges, but in the cases where there is a single frame or a single row of frames, the related bars will have shoulders projecting from only the edges adjacent to the frame.

Returning now to the horizontal level of line equipment shown near the top of frame 21 in Fig. 5, a rectangular-shaped plate 81 hingedly attached to channel strip 44 by means of screw bearing pins 82, as shown in Fig. 9, spans the actuators 501—500 as shown in Fig. 5. Flanges 83 and 831 of actuator 501 respectively loosely engage the left-hand edge and the slot 84 of plate 81 to keep actuator 501 in proper vertical alignment with plate 81, and in a similar manner actuators 502—500 are also kept in proper vertical alignment with plate 81. A cut-out 85 (Fig. 5) in plate 81 permits showing the four vertically disposed line equipment conductors 401—404 mounted in front of trunk conductor group 369 at trunk position #9, the hinged insulated plate 47 mounted in front of its respective four vertically disposed line equipment conductors (conductors not shown) at trunk position #8, and the stirrup-shaped actuator 507 mounted in front of its hinged insulated plate (hinged insulated plate not shown) at trunk position #7. An extension 86 to the right-hand end of plate 81 passing through a slot (not shown) in vertical plate 26, enables plate 81 to be operated inwardly towards the line equipment actuators 501—500 by the operation of line equipment relays 87 and 88 in the manner to be described later in this specification. Now as actuator 501 drops to its lower position by the dropping of bar 381, as explained in the preceding paragraph, lower edge 97 of flange 83 drops behind shoulder 98 of hinged plate 81, as shown in Fig. 3, and in a like manner the lower edge of flange 831 also drops behind shoulder 98 (Fig. 5). Actuator 501 is thus in a position to be operated inwardly by the operation of hinged plate 81. The remaining nine actuators 502—500 are held in the upper position by their respective bars 382—380 (only one bar can be dropped at a time and at this moment bar 381 is in the dropped position) and, consequently, the lower edges of their flanges (similar to flanges 83 and 831) are well above the lower edges of the related slots (similar to slot 84). Hence, when hinged plate 81 is operated inwardly, only actuator 501 will be correspondingly operated inwardly as the lower shoulders of plate 81 will pass under the lower edges of the flanges of actuators 502—500. It is thus apparent that the line circuit associated with this line equipment level can connect with only one trunk at one time because only one of the actuators 501—500 will be in the dropped position at any one time and, hence, no double trunk connections can occur. The operation of actuator 501 inwardly by hinged plate 81 causes actuator 501 to press the related hinged insulated plate 471 against the four associated vertically disposed line equipment conductors (similar to conductors 401—404) and thereby cause the free ends 41' of said line equipment conductors to make sliding contacts with the vertically disposed conductors 361 of the assigned trunk #1, as shown in Fig. 4.

As mentioned in the preceding paragraph, an extension 86 to hinged plate 81 passes through a slot (not shown) in vertical plate 26 for the purpose of enabling plate 81 to be operated inwardly towards the trunk selecting apparatus of the line equipment level located at the top of frame 21 (Fig. 5). The inward movement of plate 81 is accomplished through linkage controlled by the line and cut-off relays 87 and 88 in the following described manner: Referring to Figs. 5, 10—A, 10—B, 10—C and 11, a bell crank lever, or trigger device, 91 is pivoted to a bracket at the free end of armature 90 of cut-off relay 88 by means of bearing pin 92, one of its arms extending in a downwardly direction to rest against a stop bracket on the free end of armature 89 of line relay 87 and the other arm extending in a horizontal plane parallel to the bracket of armature 90. The horizontal arm of trigger device 91 is considerably heavier than the vertical arm extending downwardly to armature 89 and, consequently, with both armatures 89 and 90 in the normal, or non-operated, position, the lower end of the vertical arm of trigger device 91 is kept snugly against the stop bracket of armature 89 by the gravity pull on the horizontal arm of trigger device 91. This normal position of trigger device 91 can be seen best in Figs. 5 and 10—A.

Should armature 90 of cut-off relay 88 now be operated by the energization of cut-off relay 88, armature 90 would carry trigger device 91 with it, since trigger device 91 is pivoted to armature 90, and the vertical arm of trigger device 91 will leave the stop bracket of armature 89. A finger 95 extending from trigger device 91 over the top edge of armature 90, however, prevents the horizontal arm of trigger device 91 from dropping as the vertical arm of trigger device 91 leaves the stop bracket of armature 89. Should line relay 87 be energized instead of cut-off relay 88, armature 89 would be correspondingly operated instead of armature 90. The stop bracket of armature 89 would, therefore, carry the lower end of the vertical arm of trigger device 91 with it in a horizontal plane, thereby forcing the tip end of the normally horizontal arm of trigger device 91 upwardly in a vertical plane, as shown in Fig. 10—B. It can thus be readily seen that when cut-off relay 88 is operated while line relay 87 remains normal, trigger device 91 although moved along in a horizontal plane with cut-off armature 90 does not change its vertical plane status because the tip end of its horizontal arm is not raised; and, conversely, that when line relay 87 is operated while cut-off relay 88 remains normal, trigger device 91 does change its vertical plane status because the tip end of its horizontal arm is raised due to the lower end of its vertical arm being carried along in a horizontal plane by the stop bracket of armature 89, the pivot at 92 permitting the tip end of the horizontal arm of trigger device 91 to rise in a vertical plane. The ability to operate trigger device 91 when line relay 87 is energized and to not operate trigger device 91 when cut-off relay 88 alone is energized, is the selective medium through which the trunk selecting apparatus of the related line equipment level does or does not seize a preassigned trunk. In addition to performing mechanical functions as previously described, line relay 87 and cut-off relay 88 are equipped with contact spring sets operated by armatures 89 and 90 respectively for controlling electrical circuits associated with the equipment. Typical contact spring sets are shown in the simplified circuit of Fig. 15.

Referring now particularly to Fig. 10—A, the operation of cut-off relay 88 while line relay 87 remains normal causes armature 90 to move to the left and carry trigger device 91 with it, as previously explained. Since the tip end of the horizontal arm of trigger device 91 is not disturbed by the operation of armature 90 alone, this tip end passes underneath shoulder 96 of lever 93 and, consequently, the operation of armature 90 alone has no effect upon lever 93. This is the condition which prevails on an incoming trunk call from connector bank normals to the line circuit associated with the line equipment level.

Referring to Fig. 10—B, the operation of line relay 87 while cut-off relay 88 remains normal causes armature 89 to move to the left and carry the lower end of the vertical arm of trigger device 91 with it, as previously explained. Since the pivot point 92 for trigger device 91 is on armature 90 of cut-off relay 88 and armature 90 remains in the normal position, the tip end of the horizontal arm of trigger device 91 is raised in a vertical plane as armature 89 moves to the left, and this tip end assumes the operated position shown in Fig. 10—B at the end of the movement of armature 89. This is the condition which prevails when an out going trunk call is initiated on the line circuit associated with the line equipment level. The operation of line relay 87 also completes a circuit to the lower winding of cut-off relay 88 (Fig. 15) to cause the operation of relay 88. As armature 90 of cut-off relay 88 operates and moves to the left while line relay 87 still remains energized (Fig. 10—B), trigger device 91 is also moved to the left because it is attached to armature 90 at pivot point 92, and since the tip of the horizontal arm of trigger device 91 is aligned with shoulder 96 (Fig. 10—B) of lever 93, the movement of trigger device 91 to the left causes a corresponding movement of the upper arm of lever 93 which is pivoted by bearing pivot 94. Hence, the lower arm of lever 93 moves to the right, carrying extension 86 (Fig. 5) of hinged plate 81 with it (Fig. 10—C), and the movement of extension 86 to the right causes hinged plate 81 to be operated inwardly towards the trunk selecting apparatus of the line equipment level for the purpose of causing the line equipment to connect the associated line circuit to a pre-assigned trunk in the manner to be described later. It should be noted at this time that trigger device 91 is in reality a double pivoted lever—it is pivoted at 92 with respect to rocking its vertical and horizontal arms, and it is pivoted at the bearing points of cut-off armature 90 to have a secondary horizontal movement which is at a right angle to the plane of its rocking pivot.

Referring particularly to Fig. 4, hinged plate 81 is shown in the inwardly operated position and, consequently, actuator 501 has pressed against hinged insulated plate 471 and caused plate 471 to force the associated four vertically disposed line equipment conductors into contact with conductors 361 of trunk #1. The inwardly operated positions of plate 81, actuator 501 and plate 471 are maintained throughout the conversation period of the connection. Shortly after the line circuit is connected to conductors 361 of trunk #1, shaft 381 is returned to its upper position, as shown in Fig. 4. Upon the completion of the conversation and the subsequent releasing of cut-off relay 88, hinged plate 81 is returned to its normal position by means of spring 99 at the left-hand edge of plate 81 (Fig. 5). The four flexed vertically disposed line equipment conductors then exert their combined pressures against plate 471 at point 49' (Fig. 4) with the result that actuator 501 is urged to the right. The lower right-hand edge of stirrup 621 of actuator 501, consequently, rides up on the inclined surface of shoulder 611 of bar 381 until it is seated on ledge 631 of shoulder 611 in the manner shown to the left in Fig. 1. The releasing of cut-off relay 88 withdraws trigger device 91 from mechanical contact with shoulder 96 of lever 93, and trigger device 91 is restored to the normal position shown in Fig. 10—A. The line equipment apparatus is now at normal.

When plate 81 is in the inwardly operated position, the four vertically disposed line equipment conductors associated with actuator 501 are connected with the four conductors 361 of trunk #1, as indicated in the preceding paragraph. As long as plate 81 remains in the inwardly operated position, none of the remaining actuators 502—500 associated with trunks #2–#10 can cause the connection of their vertically disposed line equipment conductors with the related trunks #2–#10 and, consequently, the line circuit associated with the top level of line equipment cannot connect with two trunks at one time. The manner in which such double connections are avoided will now be explained.

Assuming that hinged plate 81 is in the inwardly operated position and has caused actuator 501 to connect its four vertically disposed line equipment conductors with conductors 361 of trunk #1, as shown in Fig. 4, and further that another trunk (for instance trunk #2) has been pre-assigned in the manner described elsewhere in this specification, then the relationship of plate 81 with actuator 502 associated with trunk #2 is as shown in Fig. 18. Referring to Fig. 18, it will be noted that flange 832 projects sufficiently through hole 84 in plate 81 so that lower edge 972 of flange 832 is directly above in contact with the lower edge 982 of hole 84. It is therefore, obvious from Fig. 18 that actuator 502 dropped no further when trunk #2 was pre-assigned than the relatively small distance permitted by the vertical clearance of hole 84 with respect to flange 832. It should be understood at this time that there is sufficient vertical clearances between the holes similar to hole 84 (Fig. 5) and the flanges of the respective actuators 501—500 to permit plate 81 to be swung inwardly without operating any of the actuators which are in normal, or non-pre-assigned, positions. In Fig. 18, vertical bar 382 associated with trunk #2 is shown in the dropped position because of the pre-assignment of trunk #2, but stirrup 622 of actuator 502 did not follow the dropping of ledge 635 of bar 382 because the lower edge of hole 84 retains flange 832 of actuator 502 in an approximately normal position. Actuator 502, therefore, cannot be operated by plate 81 because hole 84 in plate 81 completely clears flange 832. It should also be understood that while this paragraph refers only to flange 832 and hole 84, actuator 502 also has a right-hand flange 833 (Fig. 5) and plate 81 has a hole 841 which also co-operate in the manner described for flange 832 and hole 84. If any trunk other than trunk #2 is pre-assigned while trunk #1 remains connected to the top level line circuit, then the equivalent actuator in the top level line equipment cannot be operated by plate 81 for the same reasons just described for actuator 502 and trunk #2.

The operation of the ratchet device associated with shaft 59 will now be explained. Assuming that lever 561 is in the position shown in Fig. 2, then bar 381 is in the dropped position thereby pre-assigning trunk #1, and associated contact 601 is closed. Assuming further that the line circuit associated with the top level of line equipment shown in Fig. 5 now initiates an outgoing call, a circuit is completed through contact 601 to electromagnet 68 of the ratchet device as a result of the operation of line relay 87. This circuit closure through contact 601 causes electromagnet 68 to attract armature 70 and thereby prepare bracket assembly 72 to advance toothed wheel 69 and shaft 59. Immediately electromagnet 68 has attracted armature 70, the circuit to electromagnet 68 is opened by means to be described later, and armature 70 is restored to normal position by power spring 78. The restoration of armature 70 causes pawl 73 to advance toothed wheel 69 and shaft 59 one tooth step in a clockwise direction. Cam 581 (Figs. 2 and 5) correspondingly leaves the right-hand end of lever 561, lever 561 restores to the non-operated position shown in Fig. 1, and contact 601 opens. The circuit to electromagnet 68 is thus maintained open at contact 601 to prevent further advancement of toothed wheel 69. The restoration of lever 561 to the position shown in Fig. 1 causes bar 381 to be raised to its upper position through the medium of the spring power in contact 601, and bar 381, therefore, assumes the position shown in Fig. 4 with respect to the inwardly operated position of actuator 501. As cam 581 leaves the right-hand end of lever 561, cam 580 correspondingly approaches the right-hand end of associated lever 560 and, consequently, when shaft 59 has advanced one tooth distance (one-tenth of a revolution of shaft 59), cam 580 has raised the right-hand end of lever 560, thus dropping bar 380 to its lower position, thereby pre-assigning trunk #10.

No further action of the ratchet device is required until a line circuit initiates an outgoing trunk call and thereby connects with pre-assigned trunk #10. Assuming now that a line circuit has connected with pre-assigned trunk #10 by initiating an outgoing trunk call, then the circuit to electromagnet 68 will again be closed, this time through contact 600, and the resultant operation of armature 70 causes toothed wheel 69 and shaft 59 to advance another tooth step in the manner just described. Trunk #9 is thus pre-assigned and bar 380 is returned to its upper position. Should trunk #9, however, have been in use as trunk #10 is taken into use, then the circuit to electromagnet 68 is maintained through contact 609 by the line circuit connected to trunk #9 until the ratchet device has caused cam 588 to drop bar 388 to its lower position through the medium of lever 568 and thereby pre-assign trunk #8. In such a manner, occupied trunks are thus successively passed by until a free trunk is found. The order of trunk selection is 10—9—8—7—6—5—4—3—2—1 and then back to trunk #10.

Referring now to Fig. 1, bracket assembly 72 comprises a bracket pivoted near the end of the long arm of armature 70, a pawl 73 rigid with the bracket and extending upwardly at the left of the bracket towards toothed wheel 69, and a stop 74 also rigid with the bracket and extending upwardly at the right of the bracket towards toothed wheel 69. In the normal, or non-operated, position of armature 70, both pawl 73 and stop 74 engage teeth of wheel 69 to hold wheel 69 immovable. The energization of electromagnet 68 in the manner previously explained causes the long arm of armature 70 to be forced downwardly, overcoming the tension in power spring 78, and thus cause the withdrawal of pawl 73 and stop 74 from the respective teeth of wheel 69. Since pawl 73 in withdrawing may rub against the circumference of wheel 69 and thereby create a certain amount of anti-clockwise, or back-lash, motion of wheel 69, detent 77 engages a tooth on wheel 69 to prevent such back-lash action. As the tip of pawl 73 passes over the edge of the tooth directly below the tooth previously engaged by pawl 73, spring 76 permits the necessary temporary left-wise movement of the tip of pawl 73 to clear the tooth, and when the tip of pawl 73 passes below the edge of this tooth, spring 76 rocks bracket assembly 72 to the right to cause the tip of pawl 73 to engage the underside of the tooth at the base of the tooth. The rocking of the bracket assembly has no effect upon stop 74 since the tip of stop 74 is now clear of wheel 69. Upon the de-energization of electromagnet 68, power spring 78 returns the long arm of armature 70 to its normal position, thereby driving pawl 73 and stop 74 upwardly. Since the tip of pawl 73 is in engagement with the base of the tooth directly underneath the tooth previously engaged, the driving of pawl 73 upwardly causes the pawl to advance wheel 69 one tooth space in a clockwise direction. At the end of the stroke of pawl 73, stop 74 engages the nearest tooth at the base of the tooth to assist in holding wheel 69 in the advanced position, spring 76 permitting any required adjustments of the tips of pawl 73 and stop 74 with respect to the engaged teeth. Stop 74 now prevents clockwise rotation of wheel 69, and pawl 73 prevents anti-clockwise rotation of wheel 69. Subsequent advancements of toothed wheel 69 and shaft 59 are accomplished in the same manner just described.

At the extreme right-hand end of shaft 59 is mounted an eleventh cam 100 (Fig. 5) which actuates contact 101 once for each complete revolution of shaft 59. This cam may or may not be provided, depending upon the specific operating requirements of a given case. When cam 100 is provided, toothed wheel 69 is equipped with eleven teeth instead of ten teeth, cam 100 being so mounted on shaft 59 that it operates contact 101 only when toothed wheel 69 is advanced by pawl 73 driving the eleventh tooth. Cam 100 may be used for operating a traffic totaling meter, for controlling the pre-assignment operations relating to first choice, or graded, trunks, as a homing position, or for any special circuit control requirement associated with a given case.

Having disclosed the mechanical principles of the invention in the preceding paragraphs of this specification, reference will now be made to the single-line diagram shown in Fig. 13 and the basic circuit shown in Fig. 15 for an explanation of the operation of the apparatus. In Fig. 13 are shown two line circuits and two trunks designated line circuit #1, line circuit #2, trunk #1, and trunk #2 respectively. A sufficient amount of mechanical parts are included to make the explanation readily understandable, but these mechanical parts are shown in diagrammatic form rather than in elevation in order to reduce Fig. 13 to its simplest form. Circuit wires have been generally omitted from Fig. 13 for the same simplification reasons, a sufficient number of circuit wires being included in Fig. 15 to enable the reader to have a proper understanding of the basic circuit principles related to the invention.

Referring now to Fig. 13, line circuit #1 is connected to line equipment conductors 391—394, two of the conductors comprising the talking circuit. Line circuit #2 is similarly connected to line equipment conductors 395—398. In each line circuit instance, the associated connector bank normals are also connected to the respective line equipment conductors. Trunk #1 is shown in the pre-assigned position by the fact that actuator 501 associated with line equipment level #1 has been dropped to its lower position behind the edge of the left-hand vertical arm of plate 81 associated with line equipment level #1, and actuator 501 associated with line equipment level #2 has been similarly dropped behind the edge of the left-hand vertical arm of plate 81 associated with line equipment level #2. Trunk #2 is in the free, or normal, position because actuators 502 are in their respective upper positions well above the top ends of the right-hand vertical arms of the respective plates 81. Directly after the reference numbers 501 and 502 in Fig. 13, are indicated the reference numbers 471 and 472 of the hinged insulated plates interposed between the actuators 501 and 502 and the related vertically disposed line equipment conductors.

Considering now that an outgoing call is initiated on line circuit #1, line relay 87 is operated in a well known manner. Armature 89 of line relay 87 accordingly causes trigger device 91 to be inserted between the lower arm of cut-off relay armature 90 and the right-hand end of plate 81 in the manner previously described, and also causes the operation of cut-off relay 88. As one result of the operation of cut-off relay 88, armature 90 causes plate 81 to move to the left (inwardly towards actuators 501 and 502) because the presence of trigger device 91 between the lower arm of armature 90 and the right-hand end of plate 81 provides the addition necessary to the lower arm of armature 90 to cause the movement of plate 81 to the left. Without the aid of trigger device 91, the lower arm of armature 90 in its operated position would just reach the right-hand end of plate 81 but could not cause the moving of plate 81 to the left.

The left-wise movement of plate 81 causes its left-hand vertical arm to press actuator 501 towards the vertically disposed line equipment conductors at point 49′ (through the medium of insulated plate 471), and these vertically disposed line equipment conductors are caused to make sliding contacts with the vertically disposed bare wire conductors 361 of trunk #1. The right-hand vertical arm of plate 81 passes underneath actuator 502 and, therefore, no connection can be extended from line circuit #1 to trunk #2 at this time.

The operation of cut-off relay 88 also disconnects line relay 87 from conductors 391—394, but line relay 87 is of the slow-to-release type and, consequently, cut-off relay 88 has ample time to complete the connection of line circuit #1 to trunk #1 before line relay 87 restores. It should be noted that the restoration of line relay 87 does not remove trigger device 91 from its position between the lever arm of cut-off relay armature 90 and plate 81, as armature 90 firmly holds trigger device 91 against the right-hand end of plate 81.

Referring to Fig. 15, the basic circuit principles will now be explained. It should be understood that the circuit details disclosed in Fig. 15 are conventional only and, consequently, can be suitably changed to meet the requirements of any given case without departing from the spirit of the invention. In Fig. 15, line relay 87 is connected to negative battery and to conductor 391 of the line circuit through normally closed contact 102 of cut-off relay 88, and ground is connected to conductor 392 of the line circuit through normally closed contact 103. Consequently, when an outgoing call is initiated on the line circuit, relay 87 will be caused to operate over the direct current loop through the telephone of the line circuit in a manner well known in common battery telephone practice. The operation of line relay 87 completes a circuit through normally open contact 105 to the lower winding of cut-off relay 88, causing cut-off relay 88 to operate. The operation of cut-off relay 88 causes the line circuit to be extended to trunk #1 in the manner described in connection with the explanation of Fig. 13, and the four vertically disposed springs associated with conductors 391—394 in Fig. 15, are, therefore, closed. As is conventional in trunk arrangements of this type, a relay (not shown) is bridged across the minus and plus conductors of trunk #1 and, therefore, operates when the loop from the line circuit telephone is extended to the minus and plus conductors of trunk #1. This trunk relay then connects ground to conductor C of trunk #1, and a circuit may now be traced from ground, conductor C of trunk #1, closed contact 601 associated with trunk #1, normally closed contact 107 of relay 106, winding of electromagnet 68 of the ratchet device to negative battery, and multiple circuit through the right-hand winding of relay 106 to negative battery.

Relay 106 is a common relay associated into the operation of the ratchet device but since its functions are purely electrical, it is mounted elsewhere along with other relays which may form a telephone system utilizing this invention. Relay 106 is equipped with two windings, the left-hand winding being normally short-circuited by closed contact 108 for the purpose of causing relay 106 to be slow in operating. As soon as relay 106 operates through its right-hand winding, the short-circuiting of its left-hand winding is removed by the opening of contact 108 and relay 106, therefore, becomes fast acting with respect to releasing. Now, when the multiple circuit traced in the preceding paragraph is completed, electromagnet 68 operates and causes its armature 70 to operate and prepare pawl 73 (Fig. 2) to advance toothed wheel 69, shaft 59 and cams 581—580 one tooth step in the manner previously described. The multiple circuit through the right-hand winding of relay 106 does not have an immediate effect upon relay 106 due to the normal short-circuiting of the left-hand winding of relay 106, and, therefore, electromagnet 68 has sufficient time to operate its armature 70 before relay 106 operates. As relay 106 operates, it opens the circuit to electromagnet 68 at the now opening contact 107, and armature 70 is restored to normal position by power spring 78 (Fig. 2). The restoration of armature 70 causes pawl 73 to advance toothed wheel 69 one tooth step in the manner previously explained. The stepping of toothed wheel 69, shaft 59 and cams 581—580 causes contact 601 associated with trunk #1 to be opened and contact 600 associated with trunk #10 to be closed.

The opening of contact 601 as explained in the preceding paragraph opens the circuit to the right-hand winding of relay 106 to cause the release of relay 106 and also opens the multiple circuit to electromagnet 68 to prevent further stepping of toothed wheel 69 as far as trunk #1 is concerned as otherwise the circuit to electromagnet 68 would again be closed at contact 107 of relay 106 as relay 106 releases. Now if trunk #10 is already in use as contact 600 is closed, ground will be returned from conductor C of trunk #10 to contact 600 associated with trunk #10 and, therefore, as relay 106 released, this ground circuit will be extended to electromagnet 68, and the cycle of electromagnet 68 operating, then relay 106 operating to open this circuit to electromagnet 68, and then electromagnet 68 restoring to cause toothed wheel 69, shaft 59 and cams 581—580 to be advanced another step will be repeated. Busy trunk #10 is thus by-passed, contact 600 associated with trunk #10 is opened, and contact 609 associated with trunk #9 is closed. If trunk #9 is free, then there will be no ground on conductor C of trunk #9, no further stepping of toothed wheel 69, shaft 59 and cams 581—580 will occur as contact 609 is closed because of lack of ground at contact 609, and trunk #9 is thus pre-assigned in readiness for the next outgoing trunk call on a line circuit. In the manner just described, free trunks are pre-assigned and busy trunks are by-passed.

Returning now to the connection of the previously mentioned line circuit to trunk #1, the ground on conductor C of trunk #1 is relayed through the vertically disposed spring associated with conductor 393 to the upper winding of cut-off relay 88 and to conductor CN of the connector bank normals associated with the particular line circuit. The ground to the upper winding of cut-off relay 88 maintains the trunk connection until the calling person at the line circuit telephone disconnects by returning his handset to the telephone cradle. The ground to conductor CN of the connector bank normals guards trunk #1 and the connected line circuit against intrusion by other calls as is conventional in telephone systems of this character. When the calling person at the line circuit telephone disconnects by returning his handset to the telephone cradle, the loop to the relay (not shown) bridged across the minus and plus conductor of trunk #1 is opened, and ground is, therefore, removed from conductor C of trunk #1. Cut-off relay 88 accordingly restores to normal, causing the disconnection of the vertically disposed springs associated with conductors 391—394, contact 601 is freed of ground to make trunk #1 again available, and conductor CN of the connector bank normals is freed of ground guarding potential.

Assuming now that an incoming trunk call for line circuit #1 is received over the associated connector bank normals, then the upper winding of cut-off relay 88 is energized by ground over conductor CN of the connector bank normals (Fig. 15). The resultant operation of cut-off relay armature 90 cannot cause plate 81 to be moved to the left (Fig. 13) because trigger device 91 is clear of the lower arm of armature 90 and, consequently, line circuit #1 in this instance is not extended to a pre-assigned trunk such as trunk #1. The operation of cut-off relay 88 also removes line relay 87 from in bridge of the talking conductors of line circuit #1. Other conventional operations associated with an incoming trunk call over the connector bank normals also occur, according to the particular telephone system in use, but it is considered unnecessary to detail such operations in this specification.

The preceding explanation of the mechanical and electrical arrangements of the invention relates to the structure wherein only outgoing calls initiated on a line circuit cause the line circuit to be connected to pre-assigned trunks by means of the operation of the trunk selecting apparatus associated with the line circuit, incoming calls to the line circuit being connected to the line circuit through the medium of connector bank normals in a well-known conventional manner. The invention however, can be applied to incoming trunk calls as well as to outgoing trunk calls.

In this instance, the bare wire trunks of a frame are divided into two groups, one group for outgoing calls and the other group for incoming calls. Any line circuit associated with the frame and initiating an outgoing call is connected to a pre-assigned trunk in the outgoing trunk group in the manner already described for outgoing trunk calls. On an incoming trunk call to a line circuit, the frame equipment is controlled as a connector rather than as a line-switch, a free trunk in the incoming trunk group is selected by relay or any other well-known means, and the trunk selecting equipment of the frame is directively controlled to cause the desired line circuit to connect with the selected trunk in the incoming trunk group.

A frame arranged for combined outgoing and incoming trunk service in the manner described in the preceding paragraph provides adequate trunking facilities for a given number of line circuits. Should the number of line circuits be greater than the two groups of trunks associated with the one frame can properly care for, then two separate frames are associated together in the general manner shown in Fig. 1, one frame caring for outgoing trunk service, and the other frame for incoming trunk service. The two frames in this instance, however, are not mounted face to face as shown in Fig. 1 but in parallel rows with both frames facing in the same direction. A line relay and a cut-off relay are associated with each level of line equipments on the two frames, the two relays for each level of both frames being located at the end of one of the frames in a similar manner to that shown in Fig. 5. Linkage associated with the armatures of the two relays enable the relays to operate the line equipment on either one frame or the other depending upon whether a call is outgoing from or incoming to the line circuit. Each level of line equipment on both frames includes vertically disposed spring conductors located in front of the bare wire conductors of the frame, a vertically suspended insulating plate in front of each group of spring conductors, a vertically suspended stirrup-shaped actuator in front of each insulating plate, and a horizontally disposed hinged plate spanning the vertically suspended actuators and operable by the cut-off relay of the line circuit. A vertically disposed bar is provided for each vertical row of actuators, and, at the bottom of each frame, there is a cam shaft and associated ratchet device for controlling the vertically disposed bars. All of the equipment just described is located and arranged in the manner shown in Fig. 5.

Assuming now that two frames of line equipments are mounted in parallel rows with both frames facing in the same direction as outlined in the preceding paragraph, and that the frame to the right is arranged for outgoing trunk service and the frame to the left for incoming trunk service, then the line equipments on the same level of both frames are associated with the same one line circuit comprising a line relay and a cut-off relay, and this pair of line and cut-off relays is mounted at the right hand end of the outgoing trunk frame in the manner shown in Fig. 5. Each level of line equipment on both frames is fitted with a horizontally hinged plate similar to plate 31 in Fig. 5, and an extension such as 36 to each hinged plate passes through a slot (not shown) in the vertical plate at the right-hand ends of the two frames for the purpose of enabling the related hinged plate to be operated inwardly towards the trunk selecting apparatus of the line equipment. The inward movement of a hinged plate is accomplished through linkage controlled by the associated line and cut-off relays in the manner described in the following paragraph.

Referring now to Figs. 16—A, 16—B, 16—C, 16—D and 17 (which are similar to Figs. 10—A, 10—B, 10—C and 11 with the general exception that Figs. 16—A, 16—B, 16—C, 16—D and 17 include an outgoing trunk frame and an incoming trunk frame whereas Figs. 10—A, 10—B, 10—C and 11 include only one frame such as frame 21) a trigger device 91′ is pivoted to a bracket at the free end of armature 90 of cut-off relay 88 by means of bearing pin 92, one of its arms extending in a downwardly direction to rest against a stop bracket on the free end of armature 89 of line relay 87 and the other arm extending in a horizontal plane parallel to and beyond the bracket of armature 90. The horizontal arm of trigger device 91′ is considerably heavier than the vertical arm extending downwardly to armature 89 and, consequently, with both armatures 89 and 90 in the normal non-operated position, the lower end of the vertical arm of trigger device 91′ is kept snugly against the stop bracket of armature 89 by the gravity pull on the horizontal arm of trigger device 91′. This normal position of trigger device 91′ can best be seen in Fig. 16—A.

Should the armature 90 of cut-off relay 88 now be operated by the energization of cut-off relay 88 on an incoming trunk call, armature 90 would carry trigger device 91′ with it, since trigger device 91′ is pivoted to armature 90, and the vertical arm of trigger device 91′ will leave the stop bracket of armature 89. A finger 95′ extending from trigger device 91′ over the top edge of armature 90, however, prevents the horizontal arm of trigger device 91′ from dropping as the vertical arm of trigger device 91′ leaves the stop bracket of armature 89. Should line relay 87, however, be operated instead of cut-off relay 88, as in the case of the initiation of an outgoing trunk call on the line circuit, armature 89 would be correspondingly operated instead of armature 90. The stop bracket of armature 89 would, therefore, carry the lower end of the vertical arm of trigger device 91′ with it in a horizontal plane, thereby raising the horizontal arm of trigger device 91′ upwardly as shown in Fig. 16—C. It can thus be readily seen that when cut-off relay 88 is operated while line relay 87 remains normal, trigger device 91′ although moved along in a horizontal plane with cut-off armature 90 does not change its vertical plane status; and, conversely, when line relay 87 is operated while cut-off relay 88 remains normal, trigger device 91′ does change its vertical plane status. The ability to operate trigger device 91′ when line relay 87 is energized and to not operate trigger device 91′ when cut-off relay 88 alone is energized, is the selective medium through which the related line equipment level seizes a pre-assigned trunk on the out-going trunk frame or a selected trunk on the incoming trunk frame.

On an incoming trunk call to a line circuit, a free trunk on the incoming trunk frame is selected by relay or any other well-known means and cut-off relay 88 of the desired line circuit is operated to cause the desired line circuit to connect with the selected incoming trunk on the incoming trunk frame. Referring particularly to Fig. 16—A, the operation of cut-off relay 88 while line relay 87 remains normal causes armature 90 to move to the left and carry trigger device 91' with it, as previously explained. Since the vertical arm of trigger device 91' is not disturbed by this movement, the intermediate tip 109 of trigger device 91' passes underneath shoulder 96 of lever 93 (lever 93 being associated with the outgoing trunk frame) and, consequently, lever 93 remains in its normal position. No connection can, therefore, be made with a pre-assigned trunk on the outgoing trunk frame under this condition as lever 93 cannot operate extension 86 of the related horizontally hinged plate 81 to the right to cause such a connection. The end tip 110 of trigger device 91', however, is normally in alignment with shoulder 96' of lever 93' (lever 93' being associated with the incoming trunk frame) and, consequently, lever 93' is operated to the position shown in Fig. 10—B as a result of the operation of armature 90 alone. The operation of lever 93' (Fig. 10—B) urges extension 86' of the related horizontally hinged plate on the incoming trunk frame to the right, and this hinged plate operates the actuator on the incoming trunk frame equipment level which was previously dropped to its operating position in a manner similar to that previously explained in connection with the description of frame 21. The line circuit associated with this equipment level of the incoming trunk frame is, therefore, caused to connect with the selected incoming trunk on the incoming trunk frame. There are other electrical operations associated with the completion of an incoming trunk call when a separate incoming trunk frame is used, which operations have not been included in the foregoing explanation, but since such operations are not pertinent to the present invention and can also be accomplished in a manner well-known to the telephone art, it is deemed unnecessary to include such an explanation.

The initiation of an outgoing trunk call on a line circuit causes the operation of line relay 87 in a well-known manner. Referring particularly to Fig. 16—C, the operation of line relay 87 while cut-off relay 88 remains normal causes armature 89 to move to the left and carry the lower end of the vertical arm of trigger device 91' with it, as previously explained. Since the pivot point 92 for trigger device 91' is on armature 90 of cut-off relay 88 and armature 90 remains in the normal position, the horizontal arm of trigger device 91' is raised upwardly as armature 89 moves to the left and assumes the operated position shown in Fig. 16—C at the end of the movement of armature 89. The operation of line relay 87 also completes a circuit to cut-off relay 88 to cause the operation of relay 88. As armature 90 of cut-off relay 88 operates and moves to the left while line relay 87 still remains operated, trigger device 91' is also moved to the left because it is attached to armature 90 at pivot point 92, and since the intermediate tip 109 of trigger device 91' is now aligned with shoulder 96 of lever 93, the movement of trigger device 91' to the left causes a corresponding movement of lever 93 as shown in Fig. 16—D. The operation of lever 93 urges extension 86 of the related hinged plate 81 on the outgoing trunk frame to the right, and this hinged plate operates the particular dropped actuator on the outgoing trunk frame to cause the line circuit to be connected with the pre-assigned outgoing trunk on the outgoing trunk frame in the manner described earlier in this specification for frame 21. Since the end tip 110 of trigger device 91' was raised from its normal alignment with shoulder 96' of lever 93' by the operation of line relay armature 89, the operation of cut-off relay armature 90 causes the end tip 110 of trigger device 91' to pass over shoulder 96' of lever 93' as shown in Fig. 16—D and, consequently, the incoming trunk frame remains undisturbed in this instance. The operation of cut-off relay 88 also disconnects line relay 87 from the line circuit in a well-known manner, and after a short interval line relay 87 restores and its armature 89 assumes the position shown in Fig. 16—D. Trigger device 91', however, does not restore at this time because armature 90 of cut-off relay 88 holds trigger device 91' firmly against shoulder 96 of lever 93. From this point on the release of the connection is accomplished in the manner previously described for an outgoing trunk call on frame 21.

Should the number of outgoing trunks and incoming trunks provided by a combination of one outgoing trunk frame and one incoming trunk frame be insufficient for the number of line circuits to be associated with the frames, then a combination of one outgoing trunk frame and two incoming trunk frames is employed. This latter plan is an expansion of the principle just described whereby an incoming trunk frame is interlocked with an outgoing trunk frame so that one line relay and one cut-off relay serve both frames, and consists of the further interlocking of a third frame so that two frames are available for incoming trunk calls and one frame for outgoing trunk calls. The mechanics of this plan consists of the interlock of an outgoing trunk frame and an incoming trunk frame to provide differentiation between an outgoing trunk call and an incoming trunk call by means of a trigger device controlled by the armature of the line relay in the manner previously described; and, in addition, a second incoming trunk frame is associated with the armature of the cut-off; relay in such a manner that when all of the trunks on the first incoming trunk frame are in use, a mechanical changeover (not shown) occurs which causes subsequent incoming trunk calls to be directed to the second incoming trunk frame. The outgoing trunks on the outgoing trunk frame are "graded" without the use of special apparatus to obtain a greater percentage of trunking in the manner well known to the telephone art wherein the grading is accomplished for switches which are always returned to normal position after use, such as the "lineswitches" of this invention, by the provision of a combination of first-choice trunks individual to each sub-group of line circuits and multiple trunks common to the entire group of line circuits. The number of outgoing trunks on the outgoing trunk frame are, therefore, adjusted to care for the outgoing trunk calls of the line circuits for which the two incoming trunk frames provide a sufficient number of trunks for the incoming trunk calls.

While there has been described what is at present considered to be the preferred embodiment of the invention, it should be understood that various modifications may be made in the structure thereof, and it is contemplated in the appended claims to cover all such modifications as fall within the true spirit and scope of the invention.

What is claimed is:

1. In an electrical switching device, a row of contact actuators having flanges, a movable plate common to said actuators and having openings normally registering with said flanges, the tips of said flanges engaging said openings for retaining said flanges in alignment with said openings, means for moving any one of said actuators to a second position thereby displacing a portion of the flange of said one actuator out of registration with the respective opening in said plate, means for moving said plate to cause it to press against said displaced portion of said flange of said one actuator to urge said one actuator from said second position to a third or contact operating position, the registration of the flanges of said other actuators with the respective openings in said plate preventing said moving of said plate from disturbing said other actuators.

2. In a switching device, a plurality of contact springs, a bare wire conductor, accessible to each of said contact springs, a plurality of actuators individually associated with said contact springs, a plurality of pivoted plates individually associated wth said actuators, a bar associated with said actuators, said bar in its normal position holding said actuators in respective idle positions, means for causing the moving of said bar from its normal position to prepare said actuators so that any one of said prepared actuators may be later operated to urge its associated contact spring into connection with said bare wire conductor, means for rocking one of said plates to operate the associated prepared actuator thereby to urge said associated contact spring into connection with said bare wire conductor, means for holding said rocked plate in said rocked position, and means for restoring said other prepared actuators after said first one prepared actuator has been operated.

3. In an automatic switch, a plurality of contactors arranged in groups, a movable bar associated with each said group of contactors, each said bar in its normal position holding its associated contactors in idle positions, means for causing the moving of one of said bars from its said normal position to prepare its associated contactors for operation, means for preventing the moving of any of said other bars after said one bar has moved from its said normal position, means for operating one of said prepared contactors, means responsive to said operation of said one prepared contactor for causing the restoration of said one moved bar to the said normal position, said restoration of said one bar causing the restoration of said other prepared contactors to their said idle positions, and means for causing the moving of another one of said bars from its said normal position to prepare its associated contactors for operation.

4. In a switching device, a horizontal row of contact springs, a vertically disposed actuator associated with each said contact spring, a vertically disposed movable bar associated with each said actuator, each said bar in its normal position holding its associated actuator in an upper idle position, means for causing the dropping of one of said bars from its said normal position to a lower position, said dropping of said one bar permitting the actuator associated with said one bar to drop from said upper idle position to a lower position in which said one dropped actuator may be caused to operate the associated contact spring, means for preventing said other bars from dropping to lower positions, means for causing said one dropped actuator to operate its associated contact spring, means for causing said one dropped bar to be restored to its said normal position, means for later causing the restoration of said one operated contact spring, said one dropped actuator restored from its lower position to its said upper idle position responsive to the restoration of said one operated contact spring.

5. In a switching device, a contact actuator, a movable plate, means for preparing said actuator for operation by said plate, a lever normally ineffective for moving said plate, two electromagnets, means for operating said electromagnets, means responsive to the operation of one of said electromagnets for conditioning said lever to move said plate, means responsive to the operation of said other electromagnet for causing said conditioned lever to move said plate, said moving of said plate causing said prepared actuator to operate.

6. In a switching device, a plurality of contact actuators, a hinged plate common to said actuators, a lever normally ineffective for moving said plate, an operable bar individual to each said actuator, each said bar in its normal position retaining its individual actuator in an idle position, means for causing the operation of one of said bars to cause the moving of its individual actuator to an operating position, two electromagnets, means for operating said electromagnets, means responsive to the operation of one of said electromagnets for conditioning said lever so that said lever will be effective for moving said plate, means responsive to the operation of said other electromagnet for causing said conditioned lever to move said plate and thereby cause only said actuator in said operating position to operate, means for causing said first operated electromagnet to restore, said other operated electromagnet preventing said conditioned lever from restoring to normal.

7. In a switching device, a plurality of contactors, a hinged plate common to said contactors, means for preparing any one of said contactors for operation by said plate, a pivoted bar having two arms, two electromagnets each having an armature, a bell crank lever pivoted to said armature of one of said electromagnets, one member of said bell crank lever in mechanical contact with said armature of said other electromagnet, the other member of said bell crank lever near to one arm of said bar, said other arm of said bar in mechanical contact with said plate, means for operating said electromagnets, said armature of said other electromagnet moving said one member of said bell crank lever responsive to the operation of said other electromagnet to cause the moving of said other member of said bell crank lever into close association with said one arm of said bar, said armature of said one electromagnet causing said moved other member of said bell crank lever to move said one arm of said bar responsive to the operation of said one electromagnet, said moving of said one arm of said bar causing said other arm of said bar to rock said plate, said rocking of said plate operating said prepared contactor, means for retaining said one operated electromagnet in said operated position, means for releasing said other operated electromagnet, said one operated electromagnet holding said other member of said bell crank lever against said one arm of said bar to cause said operated position of said one operater contactor to be maintained after said other operated electromagnet has been released.

8. In an automatic switch, the combination of groups of contactors, movable bars controlling said groups of contactors, said bars in their normal positions holding their controlled contactors in non-operating positions, pivoted levers controlling said bars, a rotatable shaft having circumferentially spaced cams for operating said levers, means for rotating said shaft in steps equal to said spacings of said cams, the operation of any one lever responsive to said rotating of said shaft causing the bar controlled by said one lever to move to another position, said moving of said one bar preparing the contactors controlled by said one bar for operation, means for operating one of said prepared contactors, means responsive to said operation of said one prepared contactor for causing the restoration of said one moved bar to the said normal position, said restoration of said one moved bar causing the restoration of said other prepared contactors to their said non-operating positions, and means for causing another stepping of said shaft to cause another one of said levers to move another one of said bars.

9. In a switching device, a horizontal row of vertically disposed contact actuators, a movable controller common to said actuators for operating any one of said actuators, a vertically disposed operable shaft individual to each said actuator, each said shaft in its normal position holding its individual actuator in an upper non-operative position, means for causing the dropping of one of said shafts to a lower position, said dropping of said one shaft causing the actuator individual to said one shaft to drop from said upper non-operative position to an operating position, an electromagnet, means for operating said electromagnet to move said common controller, said one dropped actuator operated by said moving of said common controller.

10. In a switching device, two movable elements, two electromagnets, means for operating said electromagnets, a member common to said two elements and said two electromagnets, one of said elements moved by said member when said member is moved responsive to an operation of one of said electromagnets, said other element moved when said member is first moved by an operation of one of said electromagnets and then moved by an operation of the other of said electromagnets.

11. In a switching device, first and second magnets each having an armature, means for operating said magnets, a bell crank lever pivoted to the armature of said first magnet, A and B movable elements, said A element moved by one member of said lever when said one member of said lever is moved by the armature of said first magnet responsive to an operation of said first magnet alone, the second member of said lever controllable by the armature of said second magnet for changing the position of said one member of said lever so that said B element can be moved by said one member of said lever instead of said A element, said B element moved by said one member of said lever responsive to an operation of said first magnet after an operation of said second magnet has caused the changing of the position of said one member of said lever.

12. In an electrical switching device, a plurality of bare wire conductors arranged in rows substantially parallel to each other, a common conductor comprising a metallic strip fixed across said bare wire conductors but having no normal connections thereto, a plurality of contact members extending from said strip each adapted to be connected to one of said bare wire conductors, a plurality of actuators for operating said plurality of contact members, said actuators normally in positions ineffective for operating said contact members, means for causing any one of said actuators to move to an effective operating position, a movable plate, a lever, two electromagnets, means for operating said magnets, means responsive to the operation of one of said magnets for conditioning said lever to move said plate, means responsive to the operation of said other magnet for causing said conditioned lever to move said plate, said moving of said plate causing said actuator in said operating position to operate one of said contact members, said operation of said one contact member causing it to move into contact with one of said bare wire conductors thereby to connect said common conductor to said last mentioned bare wire conductor.

13. In a switching device, a horizontal row of vertically disposed contact actuators, a horizontally disposed movable plate common to said actuators, a vertically disposed movable bar individual to each said actuator, each said bar having a projection, means for supporting said bars in one position to cause said projections of said bars to hold said respective actuators in upper idle positions, means for operating said supporting means to cause the dropping of one of said bars from said one position to a lower position, the projection of said one bar correspondingly moving to a lower position responsive to said dropping of said one bar to cause the respective actuator to drop from said upper idle position to a lower operable position, and means for moving said plate to operate only said one actuator in said lower operable position.

14. In a switching device, a row of contact actuators each occupying an idle position and adapted for moving successively to a second position and to a contact operating position, each said actuator comprising a main section and a projection extending therefrom, a movable plate common to said actuators and having openings in registration with said projections of said actuators, means for moving said plate in one direction, means for thereafter causing one of said actuators to move from its idle position towards its second position, said movement of said one actuator arrested by the projection of said one actuator engaging the opening in said moved plate which is in registration with said projection of said one actuator, means for restoring said moved plate to free said projection of said one actuator from said engagement with said one opening in said plate thereby to cause said one actuator to complete its movement to its second position, said completion of said movement of said one actuator displacing at least a portion of said projection of said one actuator out of registration with said one opening in said restored plate, said first mentioned means moving said restored plate in said one direction to cause said plate to press against said displaced portion of said projection of said one actuator, thereby to urge said one actuator from its second position to its contact operating position.

15. In a switching device, a row of contact actuators each occupying an idle position and adapted for moving successively to a second position and to a contact operating position, each said actuator comprising a main section and a projection extending therefrom, a movable plate common to said actuators and having openings in registration with said projections of said actuators, means for causing any one of said actuators to move from its idle position to its second position thereby to displace at least a portion of the projection of said one actuator out of registration with the respective opening in said plate, means for moving said plate to cause said plate to press against said displaced portion of said one actuator thereby to urge said one actuator from its second position to its contact operating position, means for thereafter causing a second one of said actuators to move from its idle position towards its second position, said movement of said second actuator arrested responsive to the projection of said second actuator engaging the opening in said moved plate which is in registration with said projection of said second actuator, means for restoring said moved plate to cause said one actuator to return from its contact operating position to its second position, said restoration of said plate also freeing said projection of said second actuator from said engagement with said opening in said plate which is in registration with said projection of said second actuator, thereby to cause said second actuator to complete its movement to its second position, said completion of said movement of said second actuator displacing at least a portion of said projection of said second actuator out of registration with said last mentioned opening in said plate, said second mentioned means moving said restored plate to cause it to press against said displaced portion of said projection of said second actuator, thereby to urge said second actuator from its second position to its contact operating position.

KENNETH W. GRAYBILL.

REFERENCES CITED

The following references are of record in the file of this patent:

UNITED STATES PATENTS

| Number | Name | Date |
|---|---|---|
| 1,563,658 | Richard | Dec. 1, 1925 |
| 2,113,215 | Magrath | Apr. 5, 1938 |
| 2,322,219 | Boswau | June 22, 1943 |
| 2,367,101 | Vigren et al. | Jan. 9, 1945 |
| 2,479,678 | Graybill et al. | Aug. 23, 1949 |